United States Patent [19]

Schoen

[11] 4,172,697
[45] Oct. 30, 1979

[54] COOLING PUMP BRACKET

[76] Inventor: Otmar Schoen, Am Kirschenberg 5, D 6601 Scheidterberg 5, Fed. Rep. of Germany

[21] Appl. No.: 875,521

[22] Filed: Feb. 6, 1978

[30] Foreign Application Priority Data

Nov. 15, 1977 [DE] Fed. Rep. of Germany ....... 2750967

[51] Int. Cl.² .................................................. F04B 39/06
[52] U.S. Cl. .................................... 417/372; 415/143; 415/175; 415/177
[58] Field of Search .............................. 417/372, 368; 415/175–178, 180, 143, 121 R

[56] References Cited

U.S. PATENT DOCUMENTS

| | | | |
|---|---|---|---|
| 2,269,181 | 1/1942 | Clarke | 417/372 |
| 3,156,409 | 11/1964 | Paugh | 417/372 |
| 3,666,375 | 5/1972 | Priest et al. | 415/175 |
| 3,822,967 | 7/1974 | Cade et al. | 417/368 |
| 4,110,643 | 8/1978 | Muller et al. | 417/368 |

FOREIGN PATENT DOCUMENTS 2630513 7/1976 Fed. Rep. of Germany ........... 417/368

*Primary Examiner*—Robert E. Garrett
*Attorney, Agent, or Firm*—Roylance, Abrams, Berdo & Farley

[57] ABSTRACT

A pump bracket includes a two-part bracket housing with a heat exchanger mounted therein through which air can flow, the bracket being attached to, and between a motor and a pump. The shafts of the motor and pump are coupled together and a fan blower wheel is mounted on the motor shaft. A blower casing controls air flow to the suction side of the blower wheel. In one embodiment the casing channels incoming air from a portion of the exchanger to the suction side of the wheel which blows air out through the rest of the exchanger. In another embodiment air is drawn in through openings in the housing, directed to the suction side by the casing and blown out through the exchanger.

9 Claims, 5 Drawing Figures

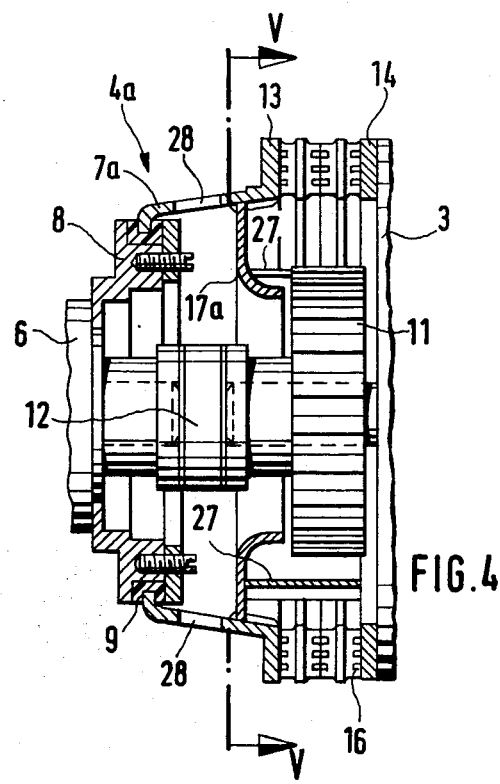
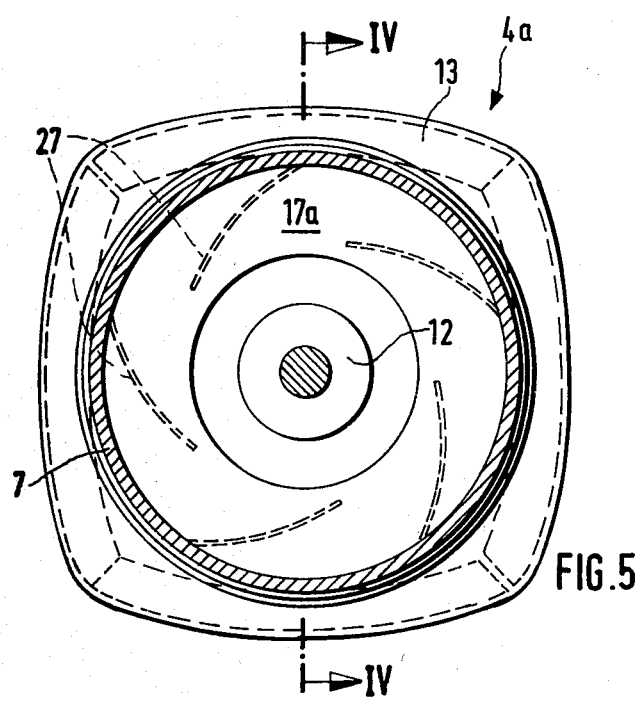

COOLING PUMP BRACKET

This invention relates to a device for interconnecting a drive motor and a pump and, particularly, to a cooling pump bracket.

BACKGROUND OF THE INVENTION

The prior art in this general category of articles includes German Offenlegungsschriften No. 1,946,401, corresponding to U.S. Pat. No. 3,666,375, which includes a pump bracket designed as a cooling casing and having an internal hollow cylindrical portion surrounding the pump shaft and an external hollow cylindrical portion axially spaced some distance therefrom and supported on the internal portion by cooling fins. The motor casing is connected to the external portion and the pump casing is connected to the internal portion. In addition to the internal portion, the external portion accommodates the coupling situated in the region of the driving motor, a blower wheel immediately following, and a bearing. An exposed helical cooling coil is arranged between the internal and external portions as well as between two cooling fins. The spacing between the driving motor casing and the pump casing is comparatively large and the heat exchanger is acted upon only by a small portion of the air supplied by the blower wheel.

BRIEF DESCRIPTION OF THE INVENTION

An object of the present invention is to provide a pump bracket including an air ducting system so that all of the air supplied by a blower wheel can be guided past the heat exchanger. Briefly described, the invention includes, in a pump bracket for interconnecting a driving motor and a pump, the motor and pump having coaxial driving and driven shafts, respectively, shaft coupling means for interconnecting said shafts, the pump bracket coaxially surrounding the shafts and the coupling means, and a blower wheel mounted within the pump bracket on one of the shafts for rotation therewith, the improvement comprising a blower casing within the pump bracket and operatively associated with the blower wheel, and a hollow cylindrical heat exchanger surrounding the blower wheel and at least a portion of the blower casing, the blower casing having a plurality of air ducts each of which has a radial component.

The blower casing arrangement is designed to assist the air ducting around the blower wheel and therethrough. The blower casing can be designed in such a way that the air sucked by the blower wheel, as well as the air blown out of it, is guided past the heat exchanger. The heat exchanger in this design is easily accessible from the outside, and is therefore easy to clean and easy to replace. Thus, a simple, functional and compact arrangement is insured with the spacing between the motor and the pump being essentially determined by the axial dimensions of the blower wheel and of the coupling.

The invention also contemplates a pump bracket wherein the blower casing is provided with at least one generally axially extending portion lying radially outwardly of the blower wheel and radially inwardly of the heat exchanger, the angular extent of the axially extending portion being less than 180°, the blower casing having means, including the axially extending portion, defining a channel for directing inward air flow through the portion of the heat exchanger within the angular extent to the inlet base of the blower wheel, the air propelled by the blower wheel passing outwardly through the portion of the exchanger not within the angular extent. Thus, there is available in a radial plane at least one suction opening and one blow opening, so that the air drawn in flows over a part of the heat exchanger and the blown out air flows over another part thereof.

An anti-noise connection between the driving motor and the pump, as well as torsional resistance, arises from a further feature of the invention including a motor-side bracket portion fixedly attached to the housing of the motor, a pump-side bracket portion fixedly attached to the casing of the pump, and means for coupling the pump-side portion to the motor-side portion including a resilient non-circular ring, the resilient ring and the portions of the bracket mating therewith having a non-circular shape.

In order that the manner in which the foregoing and other objects are attained in accordance with the invention can be understood in detail, particularly advantageous embodiments thereof will be described with reference to the accompanying drawings, which form a part of this specification, and wherein:

FIG. 4 is a partial side elevation, in section, along line 4—4 of FIG. 5, showing a second embodiment according to the invention; and FIG. 5 is a front elevation, in partial section, along line 5—5 of FIG. 4.

Figure 1:
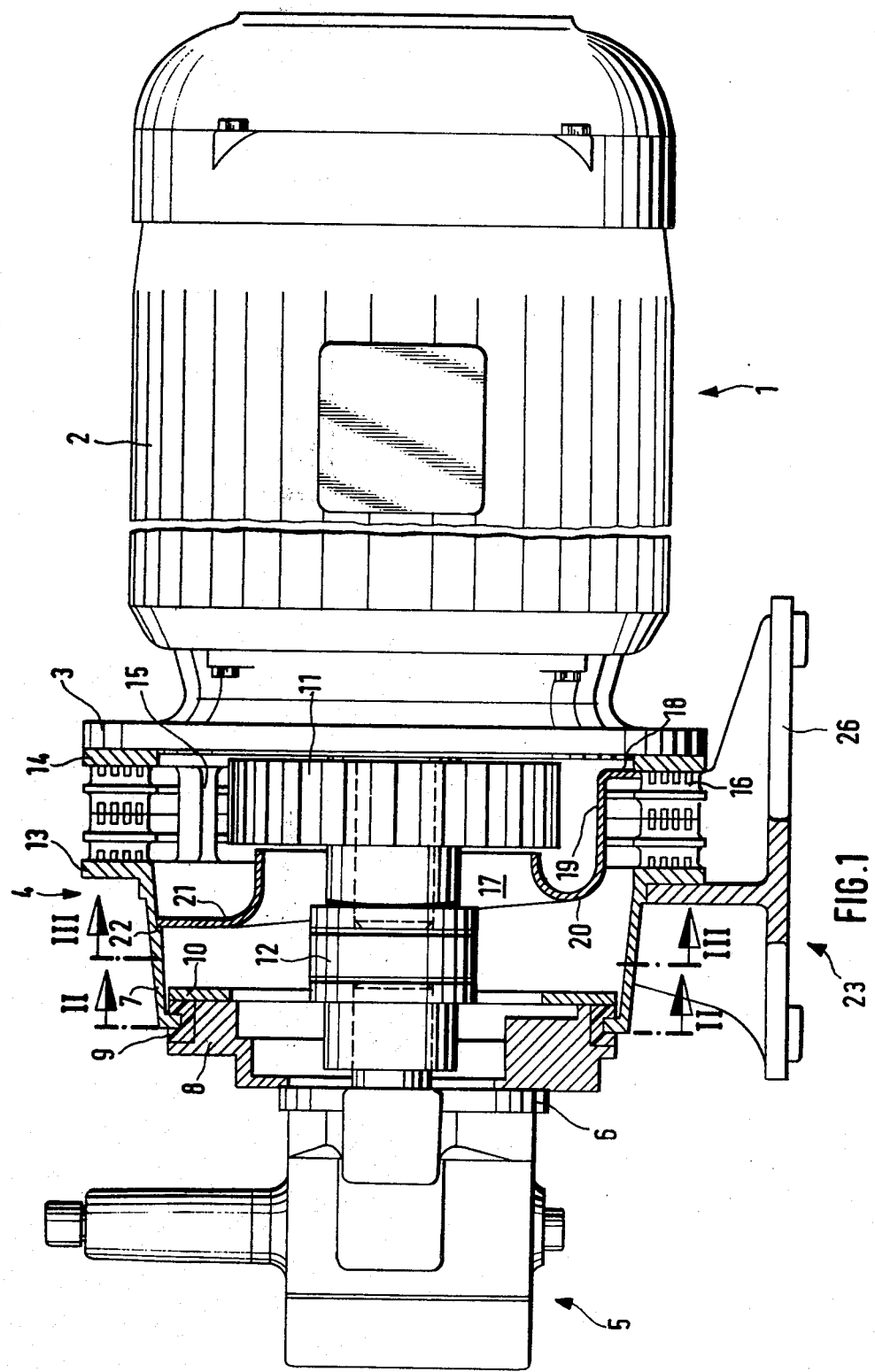
FIG. 1 is a longitudinal section of a pump bracket along line 1—1 of FIG. 3, and showing a first embodiment of the invention and side elevational views of a driving motor and pump associated therewith.
Figure 2:
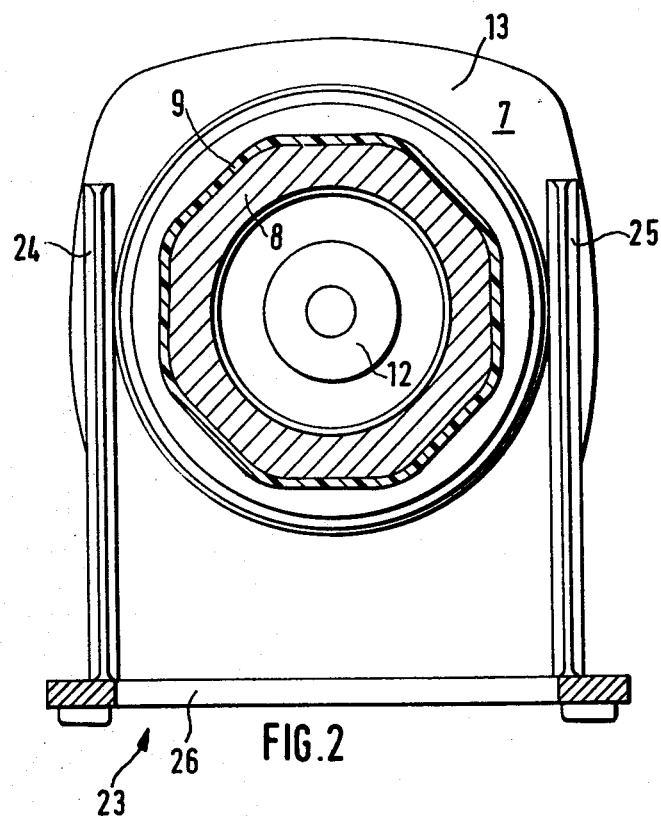
FIG. 2 is a vertical section along line 2—2 of FIG. 1.
Figure 3:
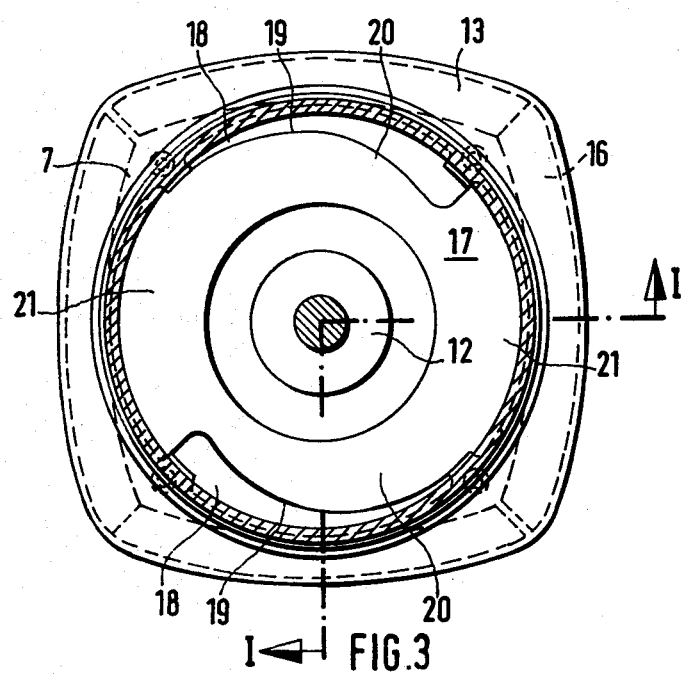
FIG. 3 is a vertical section along line 3—3 of FIG. 1.

As shown in FIGS. 1–3, the apparatus includes an electric driving motor indicated generally at 1 having a casing 2 with a mounting flange 3 attached to the front end of the casing. A pump bracket indicated generally at 4 is fixedly attached to flange 3 by screws, not shown, the arrangement shown in FIGS. 1–3 being in accordance with a first embodiment of the invention. The other end of pump bracket 4 is fixedly attached by screws, not shown, to a mounting flange 6 of the casing of a fluid pump indicated generally at 5.

The pump bracket 4 includes a motor-side bracket or housing portion 7 which is attached to flange 3 and a pump-side bracket portion 8 which is attached to flange 6. The motor-side bracket portion 7 is constructed in the form of a hollow conical frustum and the pump-side bracket portion 8 is generally in the shape of an annular disc. The frustum comprising portion 7 terminates in a generally pyramidal shape which, as best seen in FIG. 3, has an outer form similar to a rectangle with substantially equal outwardly curved sides. The periphery of the pump-side bracket portion 8 is octagonal and carries on its peripheral surface a rubber coupling ring 9 having a U-shaped cross section and receives an inwardly extending shoulder, likewise octagonal, at the mating end of motor-side bracket portion 7. The resilient rubber ring 9 lies against a shoulder of the pump-side bracket portion 8 and is retained in portion by a holding ring 10 which is attached, as by screws, onto bracket portion 8, ring 10 having the same peripheral shape as that of bracket portion 8. The special non-circular shape of the pump bracket portions 7 and 8 at the junction thereof prevents them from turning relative to one another. The resilient rubber ring is loosely arranged in the groove defined by the pump-side bracket portion 8 and holding ring 10 and is so designed that between the motor-side bracket portion 7 and the pump-side bracket portion 8 there exists a positive connection which acts on the resilient rubber ring 9 only when subjected to torsional pressure.

In the pump bracket 4 mounted coaxially to the axis of driving motor 1, there is mounted on the driving shaft of the driving motor 1 a blower wheel 11, the blower wheel being supported on the shaft for rotation therewith. A coupling 12 interconnects the driving shaft of the driving motor and the driven shaft of the fluid pump 5. The spacing between the casings of the driving motor 1 and of the fluid pump 5 is essentially defined by the sum of the respective axial dimensions of the blower wheel 11 and of coupling 12.

On the large diameter side, facing toward the driving motor 1, the motor-side bracket portion 7 has two spaced apart radially extending flanges 13 and 14, flange 14 being used to attach the driving motor 1 to mounting flange 3 and has, with the driving motor 1 in plan view, essentially the previously specified generally rectangular shape. The flange 14 is spaced from flange 13 and is attached thereto by circularly spaced apart axially extending ribs or connecting bars 15. Between flanges 13 and 14, there is arranged a heat exchanger 16 consisting of four elements, each extending over one of the curved sides of the bowed rectangle. As schematically illustrated in FIG. 3, two of the heat exchanger portions are welded together at a corner and the other two are attached to each other by threaded fasteners on their outer surfaces. The heat exchanger 16 has radially arranged ducts for the passage of air sucked inwardly by blower wheel 11 and blown outwardly thereby. The individual elements of the heat exchanger 16 can easily be removed in a radial direction from the motor-side bracket portion and inserted therein because of the threaded fasteners used to attach them in place.

Blower wheel 1 is operatively associated with a blower casing 17 which has a uniform wall thickness throughout. Casing 17 is inserted into the motor-side bracket portion 7 with initial compressive stress so that, when released, it tends to spring outwardly and is thereby held in place. Casing 17 has a generally circular shape, as to its outer periphery. If the blower casing 17 in the view shown in FIG. 3 is divided into four sectors, a pair of such sectors lying opposite each other, it will be seen that such sectors have the same construction. Casing 17 has, in the sectors shown at the top and bottom of FIG. 3, a flanged part 18 which is contiguous with the inside of flange 14, and a peripheral part 19, the wall of which extends axially and runs at right angles to the flanged part 18 (FIG. 1). Portion 19 will be seen to extend parallel to the axis of the blower wheel 11 and, as shown in FIG. 3, forms part of a helix. Flange portion 19 is continuous with a curved guide portion 20 which extends circularly around the interior of the pump bracket housing, the end of portion 20 extending back toward the suction side of blower wheel 11, facing away from drive motor 1, and terminating in an edge spaced slightly from the suction face of the blower wheel. The portions 18, 19 and 20 of blower casing 17 are designed to guide air which is sucked through the heat exchanger at the upper and lower portions thereof and guide the air toward the pump-side portion of the housing and then back toward the suction face of the blower wheel. As will be recognized, the blower wheel is of the type which is designed to draw air inwardly from the side axially facing the pump and propel air radially outwardly. Thus, the inward surface of portion 19 guides air propelled radially outwardly by the blower wheel toward the other two sectors of the heat exchanger, these being the left and right portions as viewed in FIG. 3.

The other two sectors of the blower casing have a limiting part 21 which, viewed in cross section, are first curved from the side of the blower wheel 11 facing away from the driving wheel 1 and then flared in flange-like fashion in the shape of a funnel or a trumpet ball, extending to a step 22 on the inside of the motor-side bracket portion 7, to be held on that step. The limiting part 21 demarcates the pressure side of the blower wheel 11 from the remaining interior of the motor-side bracket portion 7. The blower casing 17 is made in one piece and delimits, on the side of the blower wheel 11 facing away from the driving motor 1, an annular suction opening defined on the inside by the hub of a coupling 12 or of the blower wheel 11. Both limiting parts 21 of the blower casing 17 define the pressure side of the blower having the blower wheel 11 and is connected through the adjacent elements of the heat exchanger 16 with the environment. The blowing out sides of the blower are situated at the left and right of FIG. 3, as previously mentioned. In the view presented in FIG. 3, the blower casing 17 forms two partial casings divided by a diameter. It is also possible to divide the blower casing into more than two, and particularly into four, partial casings.

Thus, air is sucked in by the blower wheel at the top and bottom, the air then flowing through the upper end lower elements of the heat exchanger 16 into the inside of the pump bracket 4. There, the sucked air is guided to the annular suction opening of the blower and is forced outwardly by the blower wheel 11 through the elements of the heat exchanger 16 arranged at either side. The whole arrangement may likewise be designed in such a manner that, on the pressure side, the driving motor 1 is connected with the blower and that part of the air for cooling supplied by the blower wheel 11 flows through the driving motor 1 when the motor has no blower wheel of its own.

A rack 23 is attached to the pump bracket 4 for mounting the unit including the drive motor 1, the pump bracket 4 and the fluid pump 5. Rack 23 embraces with two arms 24 and 25 the motor-side bracket portion 7 and its foot 26 can be used for stationary mounting as well as for the placement of clamping bolts.

Instead of on a rack, the unit may be installed in other fashions such as with its axis normal to the cover of an oil tank.

A second embodiment of the invention is shown in FIGS. 4 and 5, which drawings have the same reference numerals as the first embodiment but followed by the letter a for this modified version. As shown therein, the motor-side bracket portion 7a of the bracket 4a and the blower casing 17a are so designed that the air is drawn in through bracket portion 7a and expelled through heat exchanger 16. For this purpose, the bracket portion 7a has, between step 22 and the pump-side end, suction slots 28 which are angularly spaced apart and distributed over the whole periphery thereof. Blower casing 17a is, on the whole, built in a manner similar to limiting part 21 and is similarly arranged. Thus, it resembles a flared conduit. Spiral baffle plates 27 are provided in the blower casing for increasing the efficiency of the blower.

While certain advantageous embodiments have been chosen to illustrate the invention, it will be understood by those skilled in the art that various changes and modifications can be made therein without departing from the scope of the invention as defined in the appended claims.

What is claimed is:

1. In a pump bracket for interconnecting a driving motor and a pump, the motor and pump having coaxial driving and driven shafts, respectively, shaft coupling means for interconnecting said shafts, the pump bracket coaxially surrounding said shafts and said coupling means, and a blower wheel mounted within said pump bracket on one of said shafts for rotation therewith, the improvement comprising a blower casing within said pump bracket and operatively associated with said blower wheel, and a hollow cylindrical heat exchanger surrounding said blower wheel and at least a portion of said blower casing, said blower casing having a plurality of air ducts each of which has a radial component.

2. A pump bracket according to claim 1 and further comprising first and second annular flanges axially spaced apart radially outwardly of said blower wheel, and a plurality of connecting bars axially extending between said flanges to hold said flanges in spaced relationship, said heat exchanger being removably mounted between said flanges.

3. A pump bracket according to claim 1 wherein said blower wheel is adapted to receive air flow generally axially thereof at an inlet face of the wheel and to propel air radially outwardly, and said blower casing is provided with at least one generally axially extending portion lying radially outwardly of said blower wheel and radially inwardly of said heat exchanger, the angular extent of said axially extending portion being less than 180°, said blower casing having means, including said axially extending portion, defining a channel for directing inward air flow through the portion of said heat exchanger within said angular extent to said inlet face, the air propelled by said blower wheel passing outwardly through the portion of said exchanger not within said angular extent.

4. A pump bracket according to claim 3 and including a motor-side bracket portion fixedly attached to the housing of said motor, a pump-side bracket portion fixedly attached to the casing of said pump, and means for coupling said pump-side portion to said motor-side portion including a resilient non-circular ring, said resilient ring and the portions of said bracket mating therewith having a non-circular shape.

5. A pump bracket according to claim 1 and including a motor-side bracket portion fixedly attached to the housing of said motor, a pump-side bracket portion fixedly attached to the casing of said pump, and means for coupling said pump-side portion to said motor-side portion including a resilient non-circular ring, said resilient ring and the portions of said bracket mating therewith having a non-circular shape.

6. A pump bracket according to claim 5 wherein the portion of said pump-side bracket portion mating with said ring includes an annular recess loosely receiving said ring and a holding ring for retaining said resilient ring, and wherein said motor-side bracket portion includes an inwardly extending shoulder mating with said resilient ring.

7. A pump bracket according to claim 6 wherein said blower wheel is mounted on said driving shaft.

8. A pump bracket according to claim 1 and including a motor-side bracket portion fixedly attached to the housing of said motor, said heat exchanger being mounted in said motor-side bracket portion, a pump-side bracket portion fixedly attached to the casing of said pump, means for coupling said pump-side portion of said motor-side portion, and means in side motor-side bracket portion between said heat exchanger and said means for coupling defining a plurality of air-intake slots, said blower wheel having a suction side and a pressure side, and wherein said blower casing defines a conduit separating the suction side of said blower wheel from the pressure side thereof.

9. A pump bracket according to claim 8 wherein said blower casing includes a plurality of baffle plates extending helically outwardly from said casing.

* * * * *